US012671714B2

(12) United States Patent
Charles et al.

(10) Patent No.: US 12,671,714 B2
(45) Date of Patent: Jun. 30, 2026

(54) LIMITING THE ABILITY OF RANSOMWARE TO SPREAD WITHIN A DATA CENTER

(71) Applicant: Dell Products L.P., Hopkinton, MA (US)

(72) Inventors: Peniel Charles, Bangalore (IN); Jason Neenan, Whitechurch (IE); Owen Crowley, Carrigaline (IE)

(73) Assignee: Dell Products L.P., Hopkinton, MA (US)

( * ) Notice: Subject to any disclaimer, the term of this patent is extended or adjusted under 35 U.S.C. 154(b) by 329 days.

(21) Appl. No.: 18/296,393

(22) Filed: Apr. 6, 2023

(65) Prior Publication Data

US 2024/0340310 A1    Oct. 10, 2024

(51) Int. Cl.
*H04L 9/40*    (2022.01)

(52) U.S. Cl.
CPC ...... *H04L 63/1466* (2013.01); *H04L 63/1416* (2013.01)

(58) Field of Classification Search
CPC ........................ H04L 63/1416; H04L 61/1466
See application file for complete search history.

(56) References Cited

U.S. PATENT DOCUMENTS

| | | | |
|---|---|---|---|
| 2011/0208933 A1* | 8/2011 | Selfin | G06F 11/108 |
| | | | 711/E12.103 |
| 2017/0322611 A1* | 11/2017 | Brennan | G06F 3/0625 |
| 2018/0293379 A1* | 10/2018 | Dahan | G06F 21/568 |
| 2019/0236274 A1* | 8/2019 | Brenner | G06F 21/6245 |
| 2020/0045058 A1* | 2/2020 | Oe | H04L 63/1416 |
| 2022/0027472 A1* | 1/2022 | Golden | G06F 21/554 |
| 2022/0070190 A1* | 3/2022 | Giterman | G06F 13/4221 |
| 2023/0367876 A1* | 11/2023 | Algieri | G06F 21/566 |

* cited by examiner

*Primary Examiner* — Daniel B Potratz
*Assistant Examiner* — Matthias Habtegeorgis
(74) *Attorney, Agent, or Firm* — Anderson Gorecki LLP

(57) ABSTRACT

In a data center, a storage array detects a ransomware attack based on suspicious data or IO activity associated with a storage object. The storage array identifies all host servers authorized to access the storage object and generates notifications that prompt the identified host servers, or possibly all connected host servers, to shut down paths to the storage array. The storage array identifies one of the host servers as the likely source of the ransomware attack based on characteristics of IOs sent to access the storage object. The storage array generates a notification to prompt that host server to shut down all paths to all storage arrays.

20 Claims, 5 Drawing Sheets

1. Initial Ransomware Infection

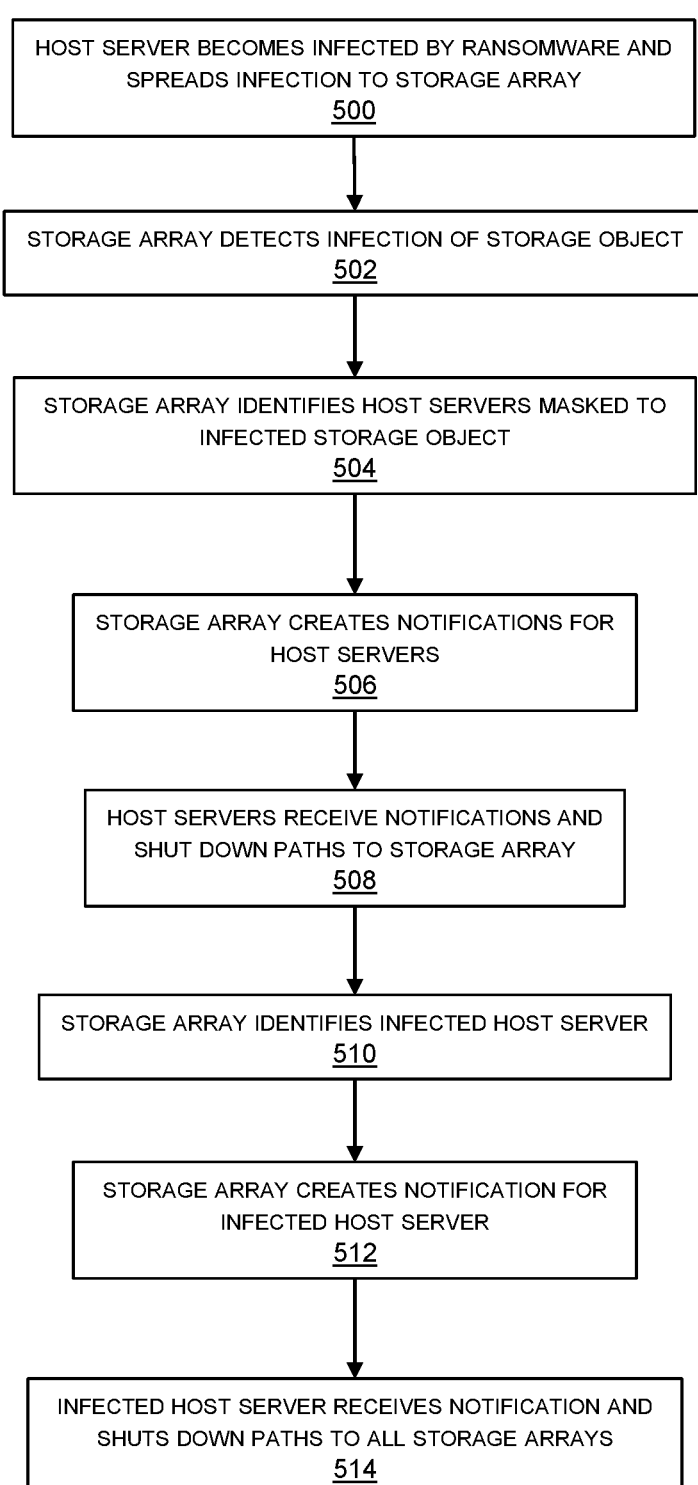

HOST SERVER BECOMES INFECTED BY RANSOMWARE AND
SPREADS INFECTION TO STORAGE ARRAY
500

STORAGE ARRAY DETECTS INFECTION OF STORAGE OBJECT
502

STORAGE ARRAY IDENTIFIES HOST SERVERS MASKED TO
INFECTED STORAGE OBJECT
504

STORAGE ARRAY CREATES NOTIFICATIONS FOR
HOST SERVERS
506

HOST SERVERS RECEIVE NOTIFICATIONS AND
SHUT DOWN PATHS TO STORAGE ARRAY
508

STORAGE ARRAY IDENTIFIES INFECTED HOST SERVER
510

STORAGE ARRAY CREATES NOTIFICATION FOR
INFECTED HOST SERVER
512

INFECTED HOST SERVER RECEIVES NOTIFICATION AND
SHUTS DOWN PATHS TO ALL STORAGE ARRAYS
514

Figure 5

LIMITING THE ABILITY OF RANSOMWARE TO SPREAD WITHIN A DATA CENTER

TECHNICAL FIELD

The subject matter of this disclosure is generally related to computing and storage equipment.

BACKGROUND

Data centers include clusters of servers and data storage nodes that are interconnected via switches. The servers run instances of host applications for performing organizational processes such as email, accounting, inventory control, e-business, and engineering. Storage of host application data is managed by the storage nodes. Input-output commands (IOs) are sent from the servers to the storage nodes to enable the host application instances to access the storage nodes to read and write the host application data. Host application instances running on multiple servers may share data stored on the same storage objects and that data may be replicated by multiple storage nodes.

Ransomware is a type of malware that is designed to render data inaccessible so that the attacker can demand payment of a ransom in exchange for restoration of data accessibility. Ransomware can render data inaccessible by encrypting the data and by locking storage objects on which the data is stored. Within a data center, ransomware may initially infect only a single server. However, the infected server can spread the infection to multiple storage arrays and the storage arrays can then spread the infection to other servers.

SUMMARY

A method in accordance with some implementations comprises detecting a ransomware attack in a first storage array, identifying a first host server as a source of the ransomware attack, and prompting the first host server to shut down all paths to a second storage array responsive to identification of the first host server as the source of the ransomware attack.

An apparatus in accordance with some implementations comprises a storage node comprising non-volatile storage and at least one compute node configured to detect a ransomware attack, identify a first host server as a source of the ransomware attack, and prompt the first host server to shut down all paths to a second storage array responsive to identification of the first host server as the source of the ransomware attack.

In accordance with some implementations, a non-transitory computer-readable storage medium stores instructions that are executed by a computer to perform a method comprising detecting a ransomware attack in a first storage array, identifying a first host server as a source of the ransomware attack, and prompting the first host server to shut down all paths to a second storage array responsive to identification of the first host server as the source of the ransomware attack.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 5 illustrates a method for isolating nodes that are infected by ransomware.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, such as abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
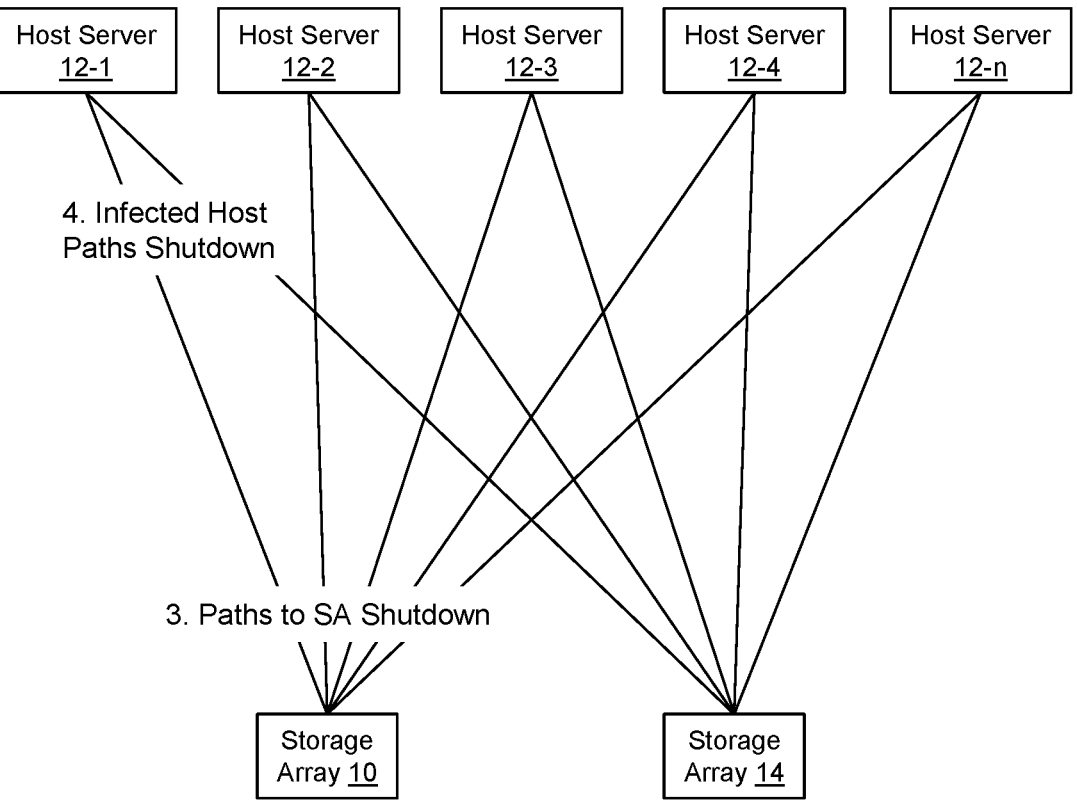
FIG. 1 illustrates a data center in which a storage array generates notifications to isolate nodes infected by ransomware.

FIG. 1 illustrates a data center in which a storage array 10 generates notifications to isolate nodes that have been infected by ransomware. The data center includes storage arrays 10, 14 and host servers 12-1, 12-2, 12-3, and 12-4 through 12-*n*. The initial ransomware infection occurs at host server 12-1. For example, the operating system of host server 12-1 may become infected through communication with a compromised client computer. That infection is spread to storage array 10 from host server 12-1. For example, host server 12-1 may start encrypting data on a storage object maintained by the storage array and transfer malicious code to the storage array. Storage array 10 is configured to detect the ransomware attack using any of a wide variety of techniques. For example, storage array 10 may detect the ransomware attack by identifying suspicious activity or suspicious data associated with the storage object that is subjected to the ransomware attack. The storage array identifies a set of host servers that could potentially be the source of the infection within the data center based on which host servers are authorized to access the affected storage object. The storage array identifies one or more of those host servers as the probable source of the infection based on the characteristics of received IOs. For example, bursts of write-after-read IOs to the storage object from host server 12-1 may indicate that host server 12-1 is infected with ransomware. The storage array 10 creates notifications for all the host servers masked to the infected storage object, or all host servers that access data from the storage array. The notifications prompt those host servers to shut down all paths to the infected storage array 12-1. The storage array 12-1 also generates a notification for the host server that was identified as being infected to prompt that host server to shut down all paths to other storage arrays, including storage array 14. Shutting down paths from the infected host server to other storage arrays may be advantageous because some storage arrays in the data center may be unable to detect the ransomware attack. Path shutdowns may be adapted for different situations because sudden shutdowns can exacerbate damage, e.g., by causing data corruption. Host servers running test environments, for example, may be allowed to have their paths abruptly terminated while host servers running production environments may use a delayed path termination approach in which new IOs are halted, pending writes are destaged and replicated, and host application instances are terminated.

Figure 2:
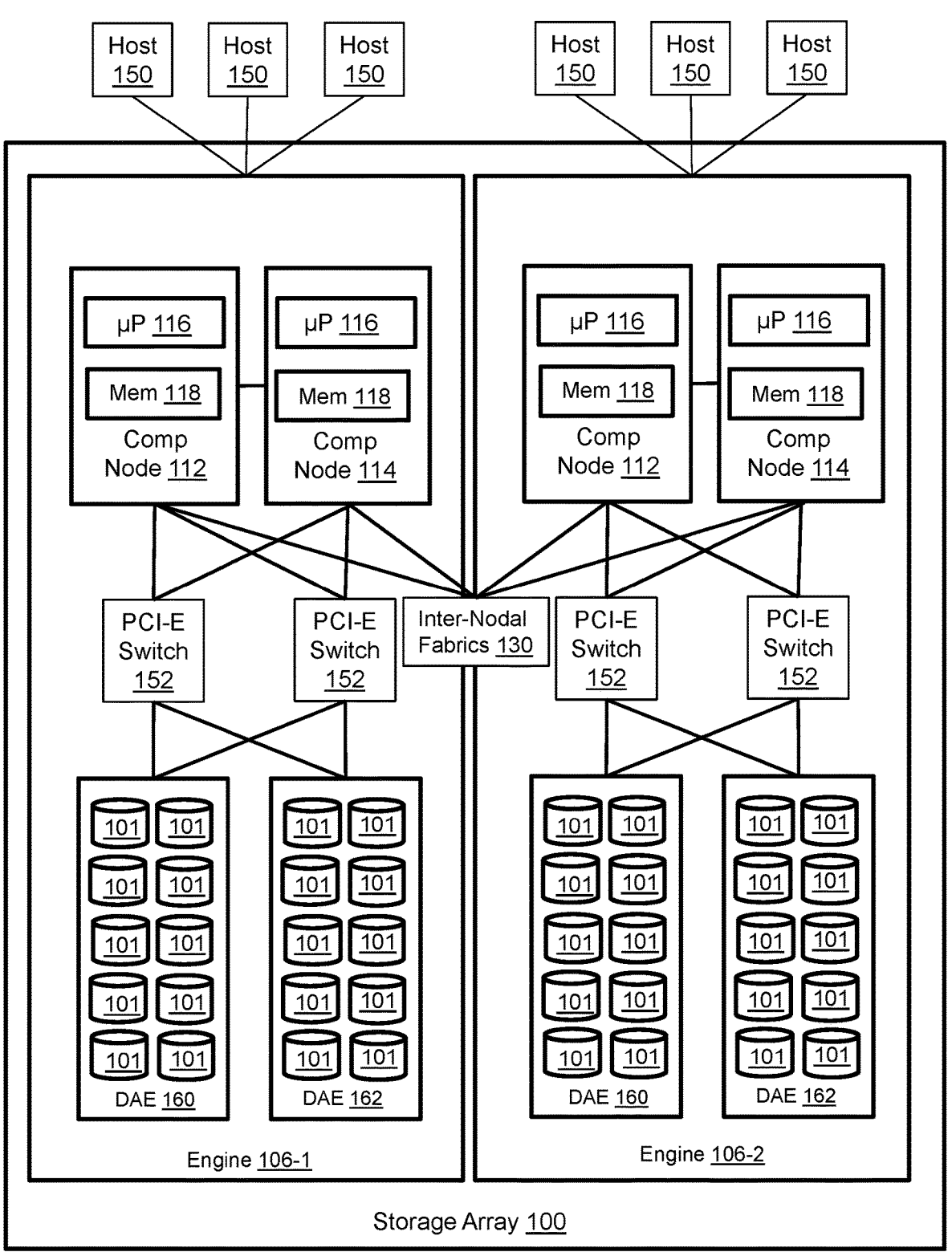
FIG. 2 illustrates a storage array in greater detail.

FIG. 2 illustrates a storage array 100 in greater detail. Storage array 100 is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. The processor 116 may include central processing units (CPUs), graphics processing units (GPUs), or both. The local memory 118 may include volatile media such as dynamic random-access memory (DRAM), nonvolatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based Infiniband fabrics 130.

Figure 3:
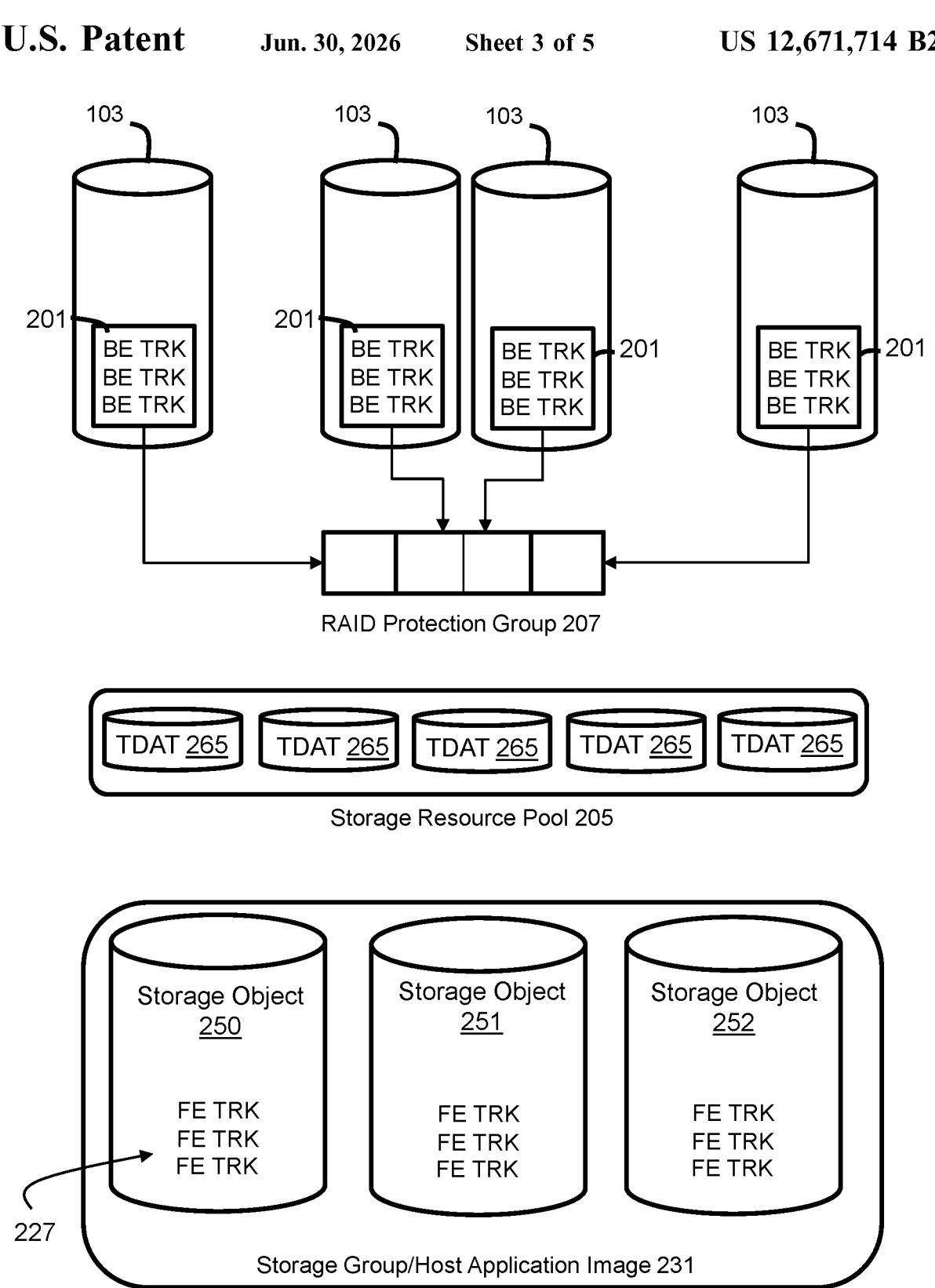
FIG. 3 illustrates how host application data is stored.

Referring to FIGS. 2 and 3, data that is created and used by instances of the host applications running on the host servers 150 is maintained on the managed drives 101. The managed drives are not discoverable by the host servers, so the storage array creates logical production storage objects 250, 251, 252 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on various managed drives 101.

IO services emulations running on the processors of the compute nodes maintain metadata that maps between the LBAs of the production storage objects 250, 251, 252 and physical addresses on the managed drives 101 in order to process IOs from the host servers. The basic allocation unit of storage capacity that is used by the compute nodes 112, 114 to access the managed drives is a back-end track (BE TRK). The managed drives are organized into same-size splits 201, each of which may contain multiple BE TRKs. Although individual drives can be configured as RAID group members, in the illustrated example a grouping of splits 201 from different managed drives is used to create a RAID protection group 207 with each split containing a protection group member. Specifically, splits from drives 101 are used to create RAID protection groups, such as RAID-5 or RAID-6. A storage resource pool 205 is a type of storage object that includes a collection of protection groups of the same RAID level on thinly provisioned logical data devices (TDATs) 265 that are used to create the production storage objects 250, 251, 252. The host application data is logically stored in front-end tracks (FE TRKs) on the production storage objects. The FE TRKs of the production storage objects are mapped to the BE TRKs on the managed drives and vice versa by tables and pointers that are maintained in the shared memory. A storage group 231 contains multiple production storage objects associated with an individual host application.

Figure 4:
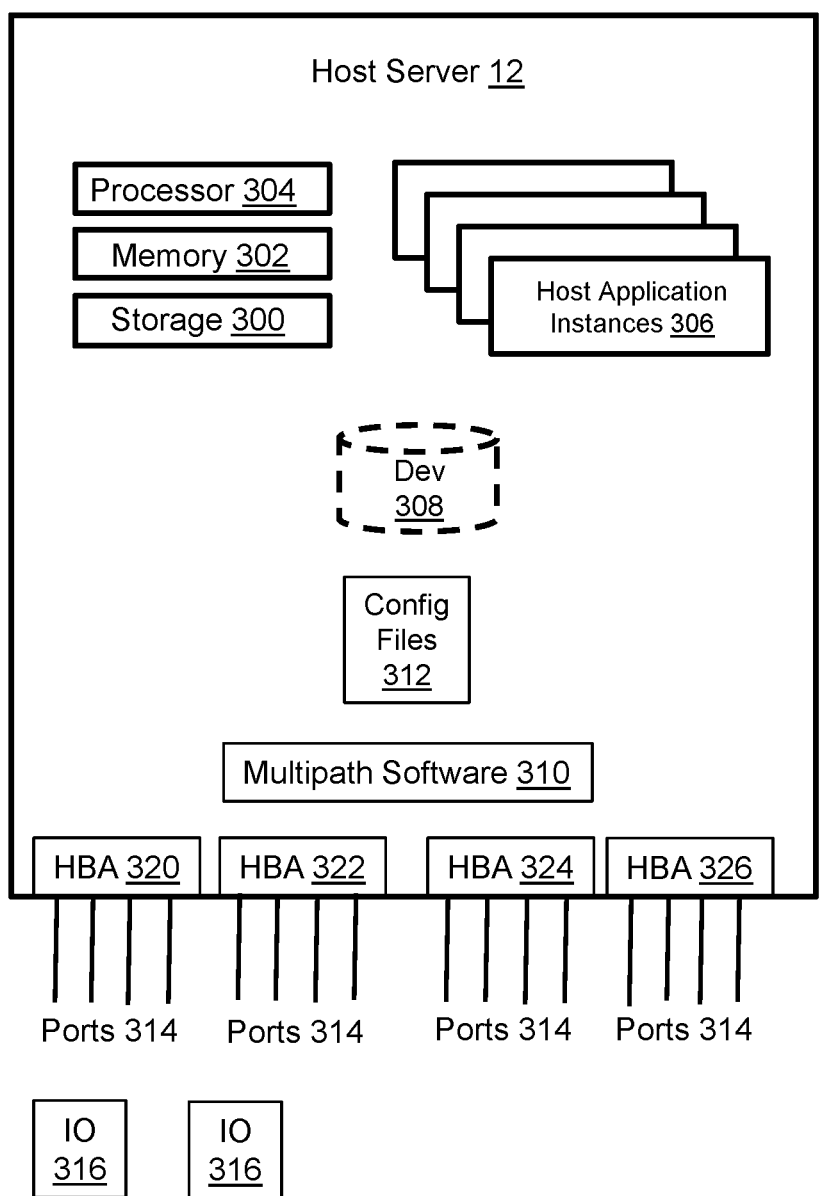
FIG. 4 illustrates a host server in greater detail.

FIG. 4 illustrates a host server 12 in greater detail. The host server includes volatile memory 302, non-volatile storage 300, one or more tangible processors 304 that support host application instances 306, Multi-Path Input-Output (MPIO) software 310 running in the host kernel, and one or more host bus adapters (HBAs) 320, each with multiple ports 314. The MPIO software 310 discovers a production storage object that is maintained and presented by the storage array. A corresponding logical host device 308 that is a representation of that production storage object is generated locally for access by the host application instances. The host application instances 306 use the logical host device 308 for data access, e.g., to read and write host application data to logical addresses. Corresponding IOs 316 are generated and sent to the storage array via the MPIO software and HBAs to access the storage object to read and write data. More specifically, the MPIO software selects from among the multiple available paths between the host server and the storage array in order to balance IO loading. The IO is sent to the storage array via the HBA ports and storage array HA ports corresponding to the selected path. Configuration files 312 maintained by the host server include metadata that describes the paths supported by the host server. For example, the port IDs (WWNs) and authentication credentials for each supported path are included in the configuration files, which may be persistently stored in storage and copied into memory for low latency access during operation. Multiple host application instance initiators may be associated with an individual HBA port as an initiator group. N_Port ID Virtualization (NPID), for example, enables multiple Fibre Channel node port IDs to share a single physical port. Each port ID is associated with or matches a WWN, so multiple WWNs can be associated with the same HBA port. An initiator group may be identified by association with the WWN of the host server. The storage array uses a masking view to map the WWNs to the storage objects to which the initiators are permitted access. The multi-path software is configured to communicate with the storage arrays to obtain notifications posted by the storage array, such as by periodically polling the compute nodes of the storage arrays for notifications using a SCSI Log Sense Command.

FIG. 5 illustrates a method for detecting a ransomware attack and isolating infected nodes. The method is responsive to a host server becoming infected by ransomware and spreading the infection to a storage array as indicated in block 500. The storage array detects the infection by discovering suspicious activity or data associated with a storage object as indicated in step 502. The storage array identifies the set of host servers masked to the affected storage object as indicated in step 504. In step 506 the storage array creates notifications for the identified host servers. In some implementations the storage array generates notifications for all connected host servers. The multi-path software instances running on the host servers periodically poll the storage array for notifications. The host servers receive the notifications as indicated in step 508 and, in response, shut down their paths to the storage array. Specifically, the multi-path software shuts down the paths. The storage array identifies the infected host server as indicated in step 510. For example, the infected host server may be identified based on characteristics of IOs sent to the affected storage object. In step 512 the storage array generates a notification for the infected host server. The infected host server receives the notification and shuts down all paths to all storage arrays as indicated in step 514. The multi-path software of the infected host server may also download the most up to date anti-virus signatures and automatically scan and run corrective actions.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:

detecting a ransomware attack in a first storage array;

identifying a first host server as a source of the ransomware attack;

prompting the first host server to shut down all paths to a second storage array responsive to identification of the first host server as the source of the ransomware attack;

responsive to identification of the first host server as the source of the ransomware attack, prompting other host servers running test environments to isolate from the ransomware attack by abruptly terminating paths to the first storage array; and, responsive to identification of the first host server as the source of the ransomware attack, prompting other host servers running production environments to delay isolating from the ransomware attack by implementing delayed path termination in which new Input-Outputs (IOs) are halted, pending writes are destaged and replicated, and host application instances are terminated.

2. The method of claim 1 further comprising prompting all host servers with paths to the first storage array to shut down those paths.

3. The method of claim 1 further comprising detecting the ransomware attack based on data or input-output activity associated with a storage object.

4. The method of claim 3 further comprising identifying all host servers authorized to access the storage object.

5. The method of claim 4 further comprising creating notifications to prompt multi-path software running on the identified host servers to shut down paths to the first storage array.

6. The method of claim 5 further comprising identifying the first host server as the source of the ransomware attack based on characteristics of input-output commands sent by the first host server to access the storage object.

7. The method of claim 6 further comprising creating a notification to prompt multi-path software running on the first host server to shut down all paths to all storage arrays.

8. A non-transitory computer-readable storage medium storing instructions that are executed by a computer to perform a method comprising:

detecting a ransomware attack in a first storage array;

identifying a first host server as a source of the ransomware attack;

prompting the first host server to shut down all paths to a second storage array responsive to identification of the first host server as the source of the ransomware attack;

responsive to identification of the first host server as the source of the ransomware attack, prompting other host servers running test environments to isolate from the ransomware attack by abruptly terminating paths to the first storage array; and responsive to identification of the first host server as the source of the ransomware attack, prompting other host servers running production environments to delay isolating from the ransomware attack by implement delayed path termination in which new Input-Outputs (IOs) are halted, pending writes are destaged and replicated, and host application instances are terminated.

9. The non-transitory computer-readable storage medium of claim 8 in which the method further comprises prompting all host servers with paths to the first storage array to shut down those paths.

10. The non-transitory computer-readable storage medium of claim 8 in which the method further comprises detecting the ransomware attack based on data or input-output activity associated with a storage object.

11. The non-transitory computer-readable storage medium of claim 10 in which the method further comprises identifying all host servers authorized to access the storage object.

12. The non-transitory computer-readable storage medium of claim 11 in which the method further comprises creating notifications to prompt multi-path software running on the identified host servers to shut down paths to the first storage array.

13. The non-transitory computer-readable storage medium of claim 12 in which the method further comprises identifying the first host server as the source of the ransomware attack based on characteristics of input-output commands sent by the first host server to access the storage object.

14. The non-transitory computer-readable storage medium of claim 13 in which the method further comprises creating a notification to prompt multi-path software running on the first host server to shut down all paths to all storage arrays.

15. An apparatus comprising:

a storage node comprising non-volatile storage and at least one compute node configured to detect a ransomware attack, identify a first host server as a source of the ransomware attack, and responsive to identification of the first host server as the source of the ransomware attack:

prompt the first host server to shut down all paths to a second storage array;

prompt other host servers running test environments to isolate from the ransomware attack by abruptly terminating shut down paths to the first storage array; and prompt other host servers running production environments to delay isolating from the ransomware attack by implementing delayed path termination in which new Input-Outputs (IOs) IOs are halted, pending writes are destaged and replicated, and host application instances are terminated.

16. The apparatus of claim 15 further comprising the compute node being configured to detect the ransomware attack based on data or input-output activity associated with a storage object.

17. The apparatus of claim 16 further comprising the compute node being configured to identify all host servers authorized to access the storage object.

18. The apparatus of claim 17 further comprising the compute node being configured to create notifications to prompt multi-path software running on the identified host servers to shut down paths to the first storage array.

19. The apparatus of claim 18 further comprising the compute node being configured to identify the first host server as the source of the ransomware attack based on characteristics of input-output commands sent by the first host server to access the storage object.

20. The apparatus of claim 19 further comprising the compute node being configured to create a notification to prompt multi-path software running on the first host server to shut down all paths to all storage arrays.

* * * * *